United States Patent
Blasius et al.

(10) Patent No.: US 11,613,433 B2
(45) Date of Patent: Mar. 28, 2023

(54) PALLETISING DEVICE AND METHOD FOR OPERATING A PALLETISING DEVICE

(71) Applicant: Koerber Supply Chain Automation Eisenberg GmbH, Eisenberg (DE)

(72) Inventors: Christopher Blasius, Boerrstadt (DE); Karlheinz Stollhof, Dannenfels (DE)

(73) Assignee: Koerber Supply Chain Automation Eisenberg GmbH, Eisenberg (DE)

( * ) Notice: Subject to any disclaimer, the term of this patent is extended or adjusted under 35 U.S.C. 154(b) by 0 days.

(21) Appl. No.: 17/269,604

(22) PCT Filed: Aug. 15, 2019

(86) PCT No.: PCT/EP2019/071949
§ 371 (c)(1),
(2) Date: Feb. 19, 2021

(87) PCT Pub. No.: WO2020/038828
PCT Pub. Date: Feb. 27, 2020

(65) Prior Publication Data
US 2021/0331879 A1     Oct. 28, 2021

(30) Foreign Application Priority Data

Aug. 21, 2018  (DE) ...................... 10 2018 214 045.6

(51) Int. Cl.
*B65G 57/06*  (2006.01)
*B65G 57/24*  (2006.01)
*B65G 57/112* (2006.01)

(52) U.S. Cl.
CPC ............. *B65G 57/24* (2013.01); *B65G 57/06* (2013.01); *B65G 57/112* (2013.01)

(58) Field of Classification Search
CPC ...... B65G 47/29; B65G 47/28; B65G 47/295; B65G 57/06; B65G 57/00; B65G 57/03;
(Continued)

(56) References Cited

U.S. PATENT DOCUMENTS

2001/0050213 A1   12/2001  Koini et al.
2013/0160403 A1    6/2013  Petrovic
(Continued)

FOREIGN PATENT DOCUMENTS

DE       3300329          7/1984
DE       19501637 A1  *   5/1996  ............. B65G 57/06
(Continued)

OTHER PUBLICATIONS

English Translation of DE 195 01 637, Weber reference. (Year: 2021).*
(Continued)

*Primary Examiner* — Gregory W Adams
(74) *Attorney, Agent, or Firm* — Dority & Manning, P.A.

(57) ABSTRACT

The invention relates to a palletizing apparatus comprising a set-down belt which has a circulating conveyor belt that defines a transport face for transporting article layers, and a compressing apparatus which has at least one front-side stop and one rear-side stop, wherein the set-down belt is movable in a longitudinal direction (X) relative to the compressing apparatus between a first longitudinal position, in which the transport face is arranged in a manner offset in the longitudinal direction (X) with respect to the compressing apparatus, and a second longitudinal position, in which an article layer located on the transport face is arranged between the stops in the longitudinal direction (X). Here, the set-down belt comprises a first deflection roller that is rotatable about a first axis of rotation, wherein a diameter of the first deflection roller is at most 2% of the width of the conveyor belt. Also provided is a control device for controlling the set-down belt, said control device being set up to drive the circulating conveyor belt with variable speeds such that, when the set-down belt moves from the second longitudinal position into the first longitudinal position, the article layer (Continued)

located on the transport face is pushed temporally in succession against the front-side stop and against the rear-side stop. The invention also relates to a method for operating a palletizing apparatus according to the invention.

5 Claims, 4 Drawing Sheets

(58) Field of Classification Search
CPC ........ B65G 57/22; B65G 57/26; B65G 57/14; B65G 57/035
USPC .. 198/397.06, 459.1, 459.9, 145, 9.7, 419.1, 198/419.3; 414/792.6, 936, 780, 781, 414/788.9, 789, 789.1, 791.6, 799
See application file for complete search history.

(56) References Cited

U.S. PATENT DOCUMENTS

| | | | |
|---|---|---|---|
| 2013/0209213 A1* | 8/2013 | Roth | ........................ B65G 57/03 414/788.9 |
| 2014/0294553 A1 | 10/2014 | Petrovic | |
| 2015/0151930 A1 | 6/2015 | Kollmuss et al. | |

FOREIGN PATENT DOCUMENTS

| | | | |
|---|---|---|---|
| DE | 19943800 | 3/2001 | |
| DE | 102010022127 A1 * | 11/2011 | ............. B65G 57/22 |
| DE | 102011088849 | 6/2013 | |
| EP | 2547612 | 1/2013 | |
| EP | 2653417 | 10/2013 | |
| FR | 2576294 | 7/1986 | |
| FR | 2696711 | 4/1994 | |

OTHER PUBLICATIONS

English Translation of DE 10 2010 022 127, Eschlbeck reference. (Year: 2021).*
International Search Report for PCT/EP2019/071949 dated Nov. 7, 2019.
International Preliminary Report on Patentability for PCT/EP2019/071949 dated Feb. 23, 2021, 7 pages.

* cited by examiner

PALLETISING DEVICE AND METHOD FOR OPERATING A PALLETISING DEVICE

The invention relates to a palletizing apparatus comprising a set-down belt which has a circulating conveyor belt that defines a transport face for transporting article layers, and a compressing apparatus which has a front-side stop and a rear-side stop, wherein the set-down belt is movable in a longitudinal direction relative to the compressing apparatus between a first longitudinal position, in which the transport face is arranged in a manner offset in the longitudinal direction with respect to the compressing apparatus, and a second longitudinal position, in which an article layer located on the transport face is arranged between the stops in the longitudinal direction. The invention also relates to a method for operating a palletizing apparatus according to the invention.

PRIOR ART

A palletizing apparatus is used to arrange articles, in particular piece goods, or containers for transport on pallets. To this end, the articles are, for example, initially combined into individual article layers and then set down in layers on a pallet, or on a layer stack already located on the pallet. A generic palletizing apparatus is known for example from the document DE 199 43 800 A1.

In order to be palletized, the articles normally pass initially through a feed apparatus, in which the articles, which initially arrive in one or more rows one after another, are rearranged and/or assembled into stackable article layers. The stackable article layers are then transferred successively to the palletizing apparatus, which sets down the article layers on a desired stacking location, in particular on a pallet.

To this end, the palletizing apparatus comprises for example a set-down belt, which comprises a circulating conveyor belt. The conveyor belt defines a transport face for transporting the articles, or the article layers. The set-down belt of the palletizing apparatus is generally movable vertically on a lifting device.

During palletization, in each case a stackable article layer is conveyed by the feed apparatus onto the transport face of the set-down belt, and the set-down belt is moved vertically to the height corresponding to the layer stack. Subsequently, the layer is set down on the layer stack. The bottommost layer of a layer stack is in this case set down directly on the pallet.

The document US 2014/0294553 A1 discloses a palletizing apparatus which comprises a conveyor belt and a set-down apparatus. During palletization, an article layer is conveyed by the conveyor belt onto a divisible bottom face of the set-down apparatus and compressed and fixed there by means of sliders. As a result of the divisible bottom face traveling away and the sliders moving away from the article layer, the article layer is set down on the layer stack.

The document US 2013/0160403 A1 also discloses a palletizing apparatus which comprises a conveyor belt and a set-down apparatus with a bottom face. During palletization, an article layer is conveyed by the conveyor belt onto the bottom face of the compressing apparatus. The compressing apparatus has a stationary or movable stop for orienting the article layer on the bottom face.

The document DE 100 18 385 A1 discloses a method and an apparatus for loading piece goods. The apparatus comprises a circulating conveyor belt, which is attached to a robot arm. During the unloading of the piece goods, the movement of the conveyor belt is synchronized with the movement of the robot arm.

The documents EP 2 653 417 A1, EP 2 881 347 B1, EP 2 547 612 B1 and DE 10 2011 088 849 A1 also disclose palletizing apparatuses and methods for palletizing article layers.

Problem

The problem addressed by the present invention is that of improving a palletizing apparatus of the type mentioned at the beginning. In particular, the problem addressed by the present invention is that of ensuring that the article layers are set down precisely on a layer stack and of avoiding damage to the article layers while they are being transported and while they are being set down.

Solution

This problem is solved by a palletizing apparatus having the features of claim 1. Advantageous configurations and developments of the invention are the subject matter of the dependent claims.

A generic palletizing apparatus comprises a set-down belt which has a circulating conveyor belt. The conveyor belt defines a transport face for transporting article layers. The palletizing apparatus also comprises a compressing apparatus which has at least one front-side stop and one rear-side stop. The front-side stop and the rear-side stop are in this case arranged in a manner offset in a longitudinal direction with respect to one another.

The set-down belt is movable in the longitudinal direction relative to the compressing apparatus between a first longitudinal position, in which the transport face is arranged in a manner offset in the longitudinal direction with respect to the compressing apparatus, and a second longitudinal position, in which an article layer located on the transport face is arranged between the front-side stop and the rear-side stop in the longitudinal direction.

According to the invention, the set-down belt comprises a first deflection roller that is rotatable about a first axis of rotation, wherein a diameter of the first deflection roller is advantageously at most 2% of the width of the conveyor belt. The first axis of rotation extends in this case in a transverse direction, which is oriented at right angles to the longitudinal direction.

In the case of an operating palletizing apparatus, the longitudinal direction and the transverse direction each extend horizontally, i.e. parallel to a floor on which the palletizing apparatus is standing. A vertical direction extends vertically with respect to the floor and at right angles to the longitudinal direction and at right angles to the transverse direction.

According to the invention, a control device for controlling the set-down belt is also provided. The control device controls the movement of the set-down belt in the longitudinal direction, that is to say from the first longitudinal position into the second longitudinal position and back again. The control device also controls the drive of the circulating conveyor belt. The control device is set up to drive the circulating conveyor belt with variable speeds such that optionally, when the set-down belt is being moved from the second longitudinal position into the first longitudinal position, the article layer located on the transport face is pushed temporally in succession against the front-side stop and against the rear-side stop.

As a result, the individual articles of the article layer can be set down very precisely directly on a pallet or on a layer stack already located on the pallet. In particular, it is also possible for complicated setting patterns to be created when setting down the articles. Such setting patterns can have in particular gaps between individual articles in the longitudinal direction.

According to a further advantageous configuration of the invention, an additional control device for controlling the set-down belt is provided, which controls the movement of the set-down belt in the longitudinal direction, i.e. from the first longitudinal position into the second longitudinal position and back again, and the drive of the circulating conveyor belt, and which is set up to drive the circulating conveyor belt largely synchronously with the movement of the set-down belt such that instances of contact of the article layer with the stops are minimized.

As a result, the speed of the circulating conveyor belt can be synchronized exactly with the movement of the set-down belt in the longitudinal direction such that the products of the article layer do not come into contact, or only minimally come into contact, with the stops of the compressing apparatus and are thus protected.

The set-down belt preferably also comprises a drive drum, which is rotatable about a drive axis, for driving the conveyor belt. The drive axis extends likewise in the transverse direction. A diameter of the drive drum is greater than the diameter of the first deflection roller. Advantageously, a drive motor for driving the drive drum with a variable speed is also provided.

Preferably, the conveyor belt bears against the first deflection roller in an angular range of 180°. As a result of the comparatively small diameter of the first deflection roller and the bearing of the conveyor belt in an angular range of 180°, the set-down belt advantageously has a small height in the vertical direction. The set-down belt is thus configured in a comparatively thin manner in the vertical direction. During the setting down of the article layer on the pallet or on the layer stack, the drop height in the vertical direction is thus very small. As a result, the setting down of the article layer is advantageously simplified.

According to a preferred configuration of the invention, a length of the transport face is between 80% and 120%, particularly preferably between 90% and 110%, of the width of the conveyor belt. The length of the transport face is in this case the extent of the transport face in the longitudinal direction. The width of the conveyor belt is the extent of the conveyor belt in the transverse direction.

According to one advantageous development of the invention, the set-down belt and the compressing apparatus are movable in a vertical direction relative to one another. As a result, after the set-down belt has been moved in the longitudinal direction to the second longitudinal position, the compressing apparatus and the set-down belt can be moved in the vertical direction relative to one another such that the article layer located on the transport face is located at the height of the stops in the vertical direction. The control device preferably also controls the movement of the set-down belt and the compressing apparatus in the vertical direction relative to one another.

According to a further advantageous development of the invention, the rear-side stop is movable in the vertical direction from a standby position into a working position. In the standby position, the rear-side stop is located above the article layer located on the transport face in the vertical direction. In the working position, the rear-side stop is located at the height of the article layer located on the transport face in the vertical direction. The control device preferably also controls the movement of the rear-side stop in the vertical direction.

The problem is also solved by a method for operating a palletizing apparatus having the features of claim 10. Advantageous configurations and developments of the invention are the subject matter of the dependent claims.

The method according to the invention for operating a palletizing apparatus according to the invention comprises the following steps:

First of all, at least one article layer is conveyed onto the transport face of the set-down belt while the set-down belt is located in the first longitudinal position, in which the transport face is arranged in a manner offset in the longitudinal direction with respect to the compressing apparatus, and if necessary, the set-down belt is also moved in the vertical direction.

Then, the set-down belt is moved in the longitudinal direction relative to the compressing apparatus to the second longitudinal position, in which an article layer located on the transport face is arranged between the front-side stop and the rear-side stop of the compressing apparatus in the longitudinal direction.

Then, the set-down belt is moved in the longitudinal direction relative to the compressing apparatus back to the first longitudinal position.

During this movement of the set-down belt in the longitudinal direction relative to the compressing apparatus, the circulating conveyor belt is driven in the longitudinal direction largely synchronously with the movement of the set-down belt, such that instances of contact of the article layer with the stops are minimized.

Alternatively, during this movement of the set-down belt in the longitudinal direction relative to the compressing apparatus, the circulating conveyor belt is driven with variable speeds such that the article layer located on the transport face is pushed temporally in succession against the front-side stop and against the rear-side stop.

In particular, at the beginning of said movement of the set-down belt, the conveyor belt can run slightly more quickly, with the result that the article layer is pushed against the front-side stop. At the end of the movement of the set-down belt, the conveyor belt can run slightly more slowly, with the result that the article layer is pushed against the rear-side stop. As a result, the article layer can be oriented in the longitudinal direction to two sides, namely to the front and to the rear. This is useful in particular when the article layer is intended to exhibit gaps between individual articles.

The movement of the set-down belt in the longitudinal direction relative to the compressing apparatus back to the first longitudinal position and the circulation of the conveyor belt are synchronized such that the set-down belt travels out from under the article layer. As a result, the article layer is set down vertically on the pallet or on the layer stack. The movement of the set-down belt in the longitudinal direction relative to the compressing apparatus back to the first longitudinal position and the circulation of the conveyor belt are controlled by the control device.

According to one advantageous configuration of the invention, after the set-down belt has been moved in the longitudinal direction to the second longitudinal position, the compressing apparatus and the set-down belt are moved in the vertical direction relative to one another such that the article layer located on the transport face is located at the height of the stops in the vertical direction. The movement of the set-down belt and of the compressing apparatus in the vertical direction relative to one another is preferably also controlled by the control device.

According to a further advantageous configuration of the invention, after the set-down belt has been moved in the longitudinal direction to the second longitudinal position, the rear-side stop is moved from a standby position, in which the rear-side stop is located above the article layer in the vertical direction, into a working position, in which the rear-side stop is located at the height of the article layer in the vertical direction. The movement of the rear-side stop in the vertical direction is preferably also controlled by the control device.

According to a further advantageous configuration of the invention, while the set-down belt is being moved in the longitudinal direction from the first longitudinal position to the second longitudinal position, the circulating conveyor belt is not driven.

FIGURES AND EMBODIMENTS OF THE INVENTION

The invention is explained in more detail in the following text on the basis of an advantageous exemplary embodiment illustrated in the figures. The invention is not limited to this exemplary embodiment, however. The figures illustrate the subject matter of the invention only schematically. In the figures.

Figure 1:
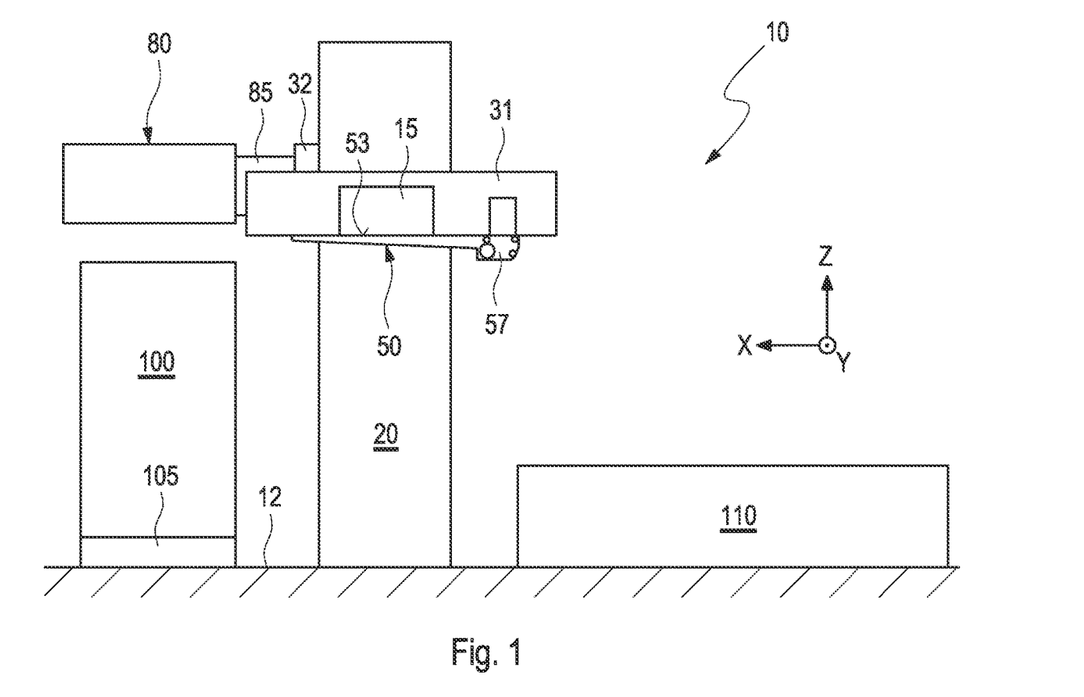
FIG. 1 shows a schematic front view of a palletizing apparatus.

FIG. 1 shows a schematic front view of a palletizing apparatus 10. The palletizing apparatus 10 stands on a floor 12 and serves to set down goods, in particular an article layer 15, on a layer stack 100 that is located on a pallet 105. The article layer 15 is fed to the palletizing apparatus 10 by a feed apparatus 110. In this case, first of all individual goods are combined by the feed apparatus 110 into a stackable article layer 15, and the article layer 15 is subsequently transported further in a longitudinal direction X to the palletizing apparatus 10. The longitudinal direction X extends parallel to the floor 12.

The palletizing apparatus 10 comprises a lifting apparatus 20, which extends substantially in a vertical direction Z away from the floor 12. The vertical direction Z extends at right angles to the floor 12 and at right angles to the longitudinal direction X. A transverse direction Y extends at right angles to the vertical direction Z and at right angles to the longitudinal direction X.

Arranged in the present case on the lifting apparatus 20 is a first carriage 31, which is movable in the vertical direction Z. Fastened to the first carriage 31 is a set-down belt 50. The set-down belt 50 is thus movable in the vertical direction Z relative to the lifting apparatus 20. The set-down belt 50 is additionally movable in the longitudinal direction X relative to the first carriage 31 and to the lifting apparatus 20.

The set-down belt 50 comprises a circulating conveyor belt 52, concealed here, which defines a transport face 53 for transporting the article layer 15. The transport face 53 extends in a plane that is defined by the longitudinal direction X and the transverse direction Y. The vertical direction Z thus extends at right-angles to the transport face 53. The set-down belt 50 also has two side walls 57, which extend predominantly in the longitudinal direction X and parallel to one another.

Also arranged in the present case on the lifting apparatus 20 is a second carriage 32, which is movable in the vertical direction Z. Fastened to the second carriage 32 is a compressing apparatus 80. The compressing apparatus 80 is thus movable in the vertical direction Z relative to the lifting apparatus 20. The first carriage 31 and the second carriage 32 are movable in the vertical direction Z more or less independently of one another. Thus, the compressing apparatus 80 and the set-down belt 50 are also movable in the vertical direction Z more or less independently of one another and relative to one another.

The compressing apparatus 80 has an arm 85 for fastening to the second carriage 32. The set-down belt 50 is also movable in the longitudinal direction X relative to the compressing apparatus 80. Thus, the transport face 53 is also movable in the longitudinal direction X relative to the compressing apparatus 80.

It is also conceivable for the second carriage 32 to be dispensed with and for the compressing apparatus 80 likewise to be fastened to the first carriage 31. In this case, the compressing apparatus 80 and the set-down belt 50 are movable jointly in the vertical direction Z relative to the lifting apparatus 20. The compressing apparatus 80 and the set-down belt 50 are in this case also movable in the longitudinal direction X relative to one another, but not movable in the vertical direction Z relative to one another.

It is likewise conceivable for a further lifting device to be present between the feed apparatus 110 and the set-down belt 50, in order to minimize the lifting distance of the set-down belt 50.

In the illustration shown here, an article layer 15 is located on the transport face 53 of the set-down belt 50. The set-down belt 50 is located in a first longitudinal position. In the first longitudinal position, the transport face 53 of the set-down belt 50 is arranged in a manner offset in the longitudinal direction X with respect to the compressing apparatus 80.

Figure 2:
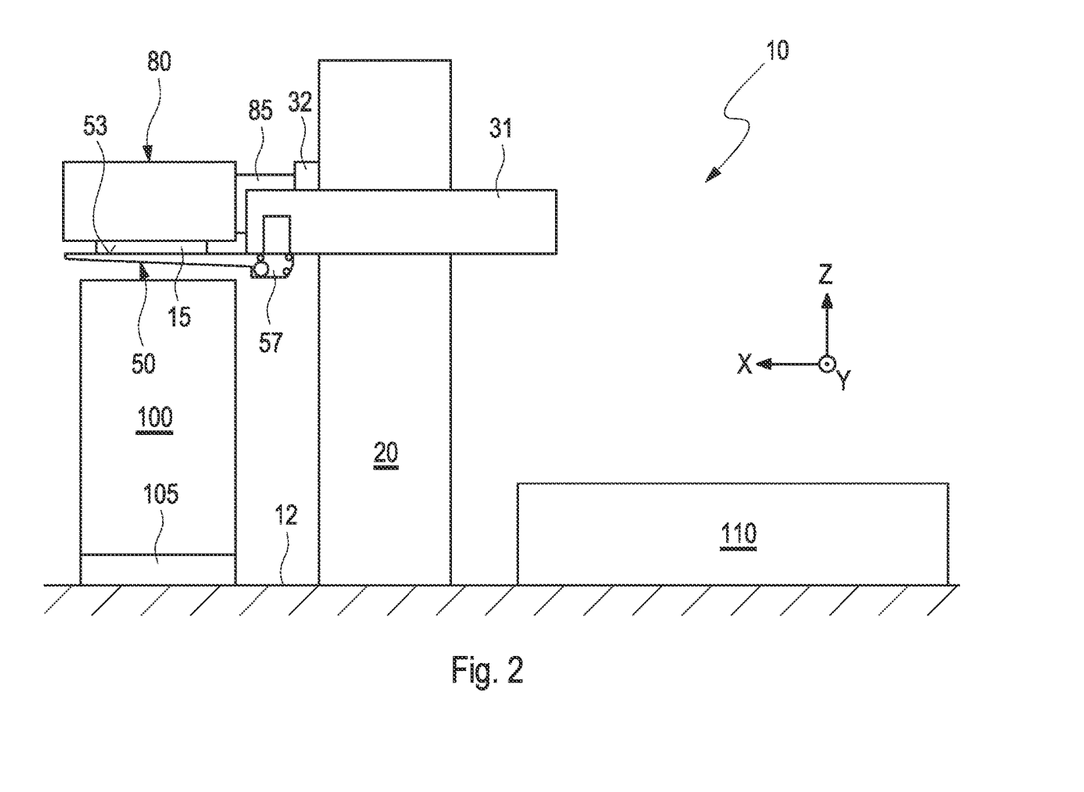
FIG. 2 shows a further schematic front view of the palletizing apparatus from FIG. 1.

FIG. 2 illustrates a further schematic front view of the palletizing apparatus 10 from FIG. 1. In contrast to the illustration in FIG. 1, in the illustration in FIG. 2, the set-down belt 50 is located in a second longitudinal position. In the second longitudinal position, the transport face 53 of the set-down belt 50 is arranged directly beneath the compressing apparatus 80. In this case, the article layer 15 located on the transport face 53 projects into the compressing apparatus 80.

During palletization, the article layer 15 is set down on the layer stack 100 located on the pallet 105. The pallet 105 is in this case located beneath the compressing apparatus 80 in the vertical direction Z. A plurality of article layers 15 form the layer stack 100 on the pallet 105.

Figure 3:
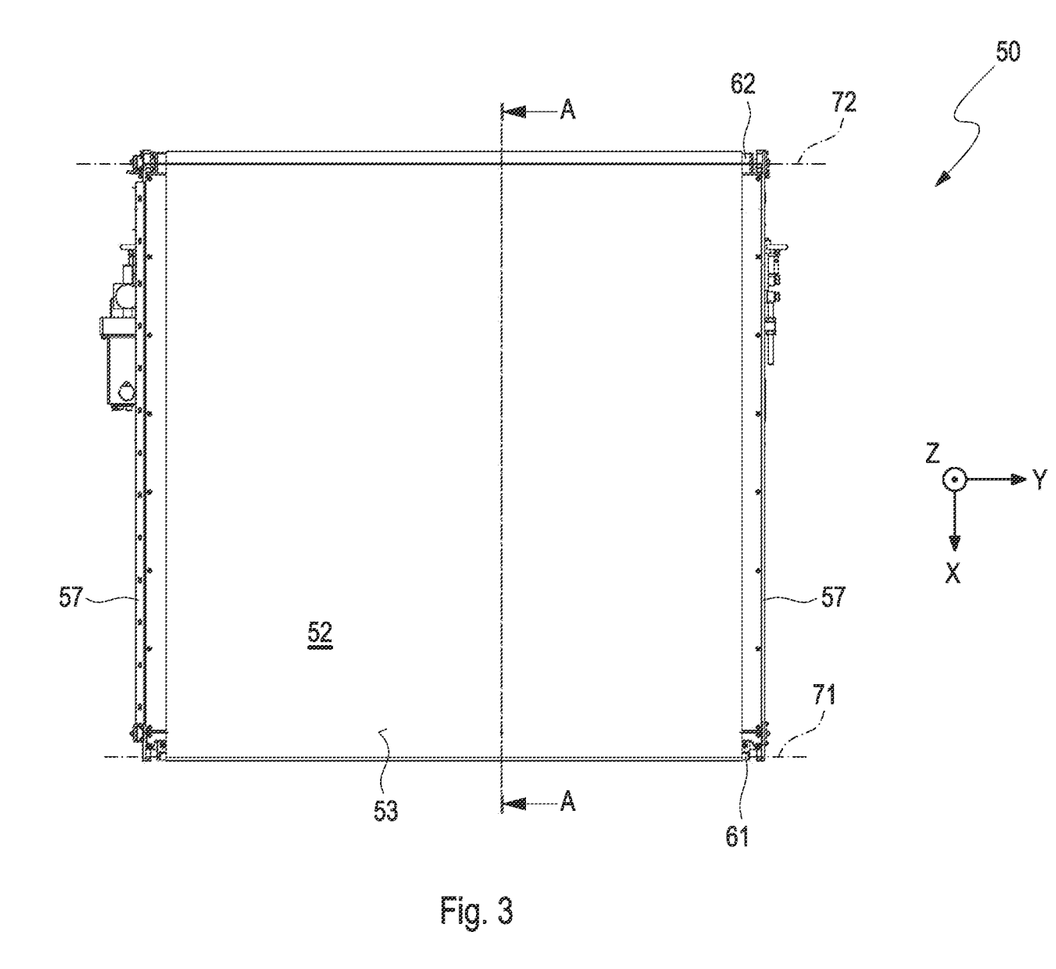
FIG. 3 shows a plan view of a set-down belt.

FIG. 3 shows a plan view of the set-down belt 50, illustrated in FIG. 1, of the palletizing apparatus 10. The lifting apparatus 20 and the first carriage 31 arranged thereon are not illustrated in this case. The set-down belt 50 comprises, inter alia, a first deflection roller 61, which is rotatable about a first axis of rotation 71, and a second deflection roller 62, which is rotatable about a second axis of rotation 72. The first axis of rotation 71 and the second axis of rotation 72 extend parallel to one another in the transverse direction Y. The first deflection roller 61 and the second deflection roller 62 are mounted in the side walls 57.

The transport face 53 of the conveyor belt 52 extends in the longitudinal direction X substantially between the first deflection roller 61 and the second deflection roller 62. The conveyor belt 52 has an extent in the transverse direction Y, which is also referred to as the width. The transport face 53 has an extent in the longitudinal direction X, which is also referred to as the length. The transport face 53 of the conveyor belt 52 is configured in a rectangular, predominantly approximately square, manner. The width of the conveyor belt 52 thus corresponds at least approximately to the length of the transport face 53. The distance of the side walls 57 from one another is slightly greater than the width of the transport face 53.

Figure 4:
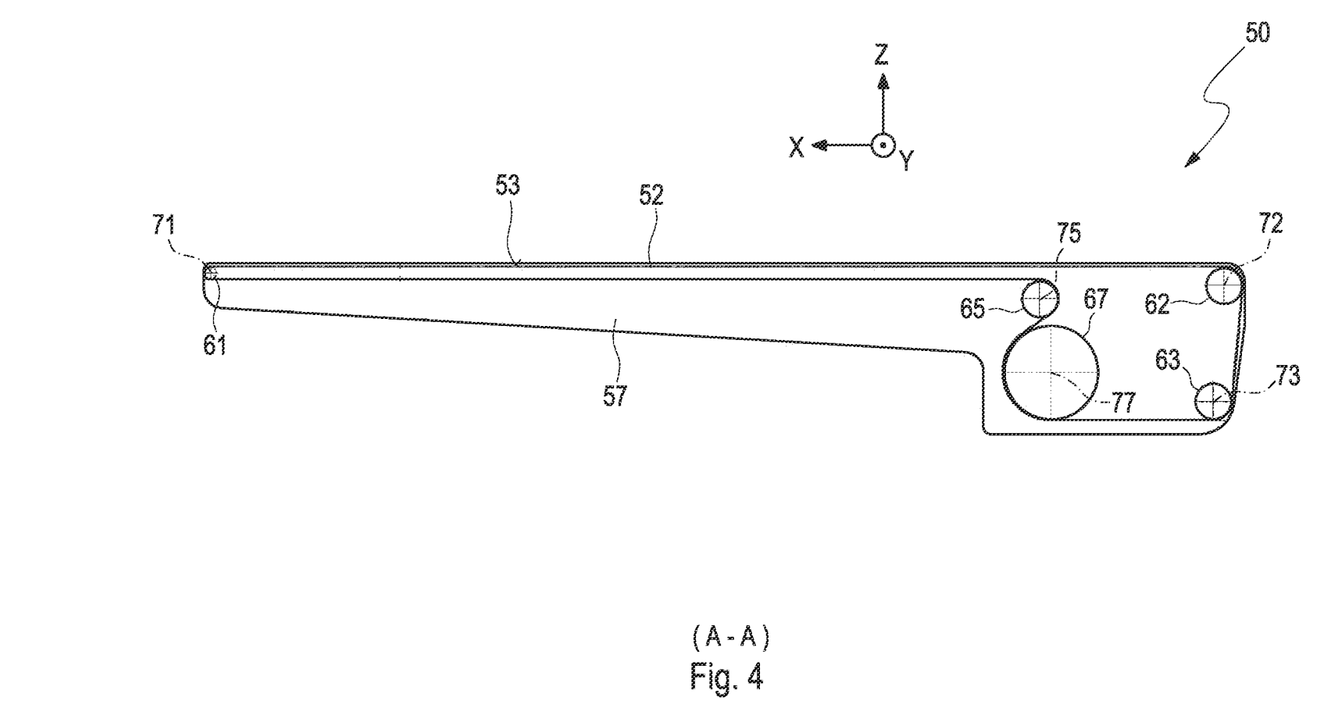
FIG. 4 shows a sectional illustration of the set-down belt along the section line A-A in FIG. 3.

FIG. 4 shows a sectional illustration of the set-down belt 50 from FIG. 3 along the section line A-A indicated therein. The set-down belt 50 comprises, as mentioned above, the first deflection roller 61, which is rotatable about the first axis of rotation 71, and also the second deflection roller 62, which is rotatable about the second axis of rotation 72, and the circulating conveyor belt 52. The set-down belt 50 furthermore comprises a tensioning roller 65, which is rotatable about a tensioning axis 75. In addition, the set-down belt 50 comprises a third deflection roller 63, which is rotatable about a third axis of rotation 73, and a drive drum 67, which is rotatable about a drive axis 77, and which is able to be driven by a drive motor (not illustrated here).

A diameter of the first deflection roller 61 is advantageously at most 2%, in the present case about 1.5%, of the width of the conveyor belt 52. The conveyor belt 52 bears against the first deflection roller 61 in an angular range of 180°. As a result of the comparatively small diameter of the first deflection roller 61 and the bearing of the conveyor belt 52 in an angular range of 180°, the set-down belt 50 has a comparatively small height in the vertical direction Z.

The drive drum 67 serves to drive the conveyor belt 52. When the conveyor belt 52 is driven by the drive drum 67, an article layer 15 located on the transport face 53 moves in the longitudinal direction X in the direction of the first axis of rotation 71. The drive axis 77 likewise extends in the transverse direction Y. A diameter of the drive drum 67 is greater than the diameter of the first deflection roller 61.

Figure 5:
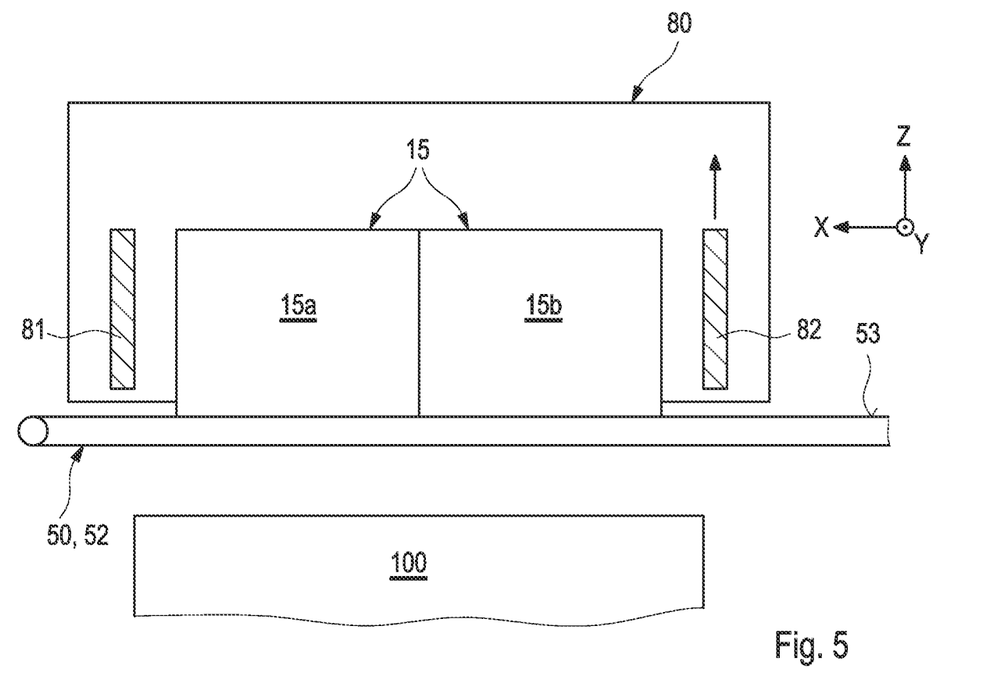
FIG. 5 shows a schematic sectional illustration of the set-down belt and of the compressing apparatus from FIG. 2.

FIG. 5 shows a schematic sectional illustration of the set-down belt 50 and of the compressing apparatus 80 from FIG. 2. The chosen section plane extends in this case at right angles to the transverse direction Y and parallel to the longitudinal direction X and also parallel to the vertical direction Z. The compressing apparatus 80 has a front-side stop 81 and a rear-side stop 82. The set-down belt 50 is located in the second longitudinal position, and the article layer 15 located on the transport face 53 of the set-down belt 50 is arranged in the longitudinal direction X between the front-side stop 81 and the rear-side stop 82.

The article layer 15 comprises, in this example, a first article 15a and a second article 15b. The articles 15a, 15b are in this case arranged in a manner offset in the longitudinal direction X with respect to one another. The first article 15a faces the front-side stop 81, and the second article 15b faces the rear-side stop 82.

In the illustration shown here, the rear-side stop 82 is in a working position. In the working position, the rear-side stop 82 is located at the same height as the front-side stop 81 and as the article layer 15 in the vertical direction Z. The rear-side stop 82 is movable in translation in the vertical direction Z into a standby position. An arrow indicates the direction of movement of the rear-side stop 82, namely in translation in the vertical direction Z between the working position and the standby position. Alternatively, the rear-side stop 82 can also move in rotation between the standby position and the working position.

When the rear-side stop 82 is located in the standby position, the article layer 15 located on the transport face 53 of the set-down belt 50 can be moved through, in the longitudinal direction X, under the rear-side stop 82 and into the compressing apparatus 80. To this end, the set-down belt 50 with the article layer 15 is moved from the first longitudinal position, in which the transport face 53 is arranged in a manner offset in the longitudinal direction X with respect to the compressing apparatus 80, into the second longitudinal position, in which the article layer 15 located on the transport face 53 is arranged between the two stops 81, 82 in the longitudinal direction X. Subsequently, the rear-side stop 82 is moved downward into the working position. Then, the rear-side stop 82 is also located at the height of the article layer 15 in the vertical direction Z.

It is also conceivable for the rear-side stop 82 not to be movable in the vertical direction Z but to always be located at the same height as the front-side stop 81 in the vertical direction Z. In this case, the set-down belt 50 with the article layer 15 is first of all moved from the first longitudinal position, in which the transport face 53 is arranged in a manner offset in the longitudinal direction X with respect to the compressing apparatus 80, into the second longitudinal position, in which the article layer 15 located on the transport face 53 is arranged between the two stops 81, 82 in the longitudinal direction X. In this case, the set-down belt 50 with the article layer 15 is located beneath the compressing apparatus 80 in the vertical direction Z. The stops 81, 82 are thus located above the article layer 15 in the vertical direction Z. Subsequently, the compressing apparatus 80 is moved downward in the vertical direction Z relative to the set-down belt 50 until the stops 81, 82 are located at the level of the article layer 15 in the vertical direction Z.

In order to set down the article layer 15 on the layer stack 100 located on the pallet 105, the set-down belt 50 is moved back into the first longitudinal position from the second longitudinal position. The movement of the set-down belt 50 in the longitudinal direction X relative to the compressing apparatus 80 back to the first longitudinal position and the circulation of the conveyor belt 52 are synchronized such that the set-down belt 50 travels out from under the article layer 15. As a result, the article layer 15 is set down vertically on the layer stack 100. The movement of the set-down belt 50 in the longitudinal direction X relative to the compressing apparatus 80 and the circulation of the conveyor belt 52 are in this case controlled by a control device (not illustrated here).

During said movement of the set-down belt 50 from the second longitudinal position into the first longitudinal position, the circulating conveyor belt 52 is driven with variable speeds such that the article layer 15 located on the transport face 53 is pushed temporally in succession against the front-side stop 81 and against the rear-side stop 82. Alternatively, the circulating conveyor belt 52 is driven largely synchronously with the movement of the set-down belt 50 such that instances of contact of the article layer 15 with the stops 81, 82 are minimized, in particular such that the article layer 15 located on the transport face 53 is kept away from the stops 81, 82 as much as possible.

At the start of said movement of the set-down belt 50 from the second longitudinal position into the first longitudinal position, the conveyor belt 52 is driven slightly more quickly. As a result, the first article 15a of the article layer 15 is pushed against the front-side stop 81. At the end of the movement of the set-down belt 50 from the second longitudinal position into the first longitudinal position, the conveyor belt 52 is driven slightly more slowly. As a result, the second article 15b of the article layer 15 is pushed against the rear-side stop 82. As a result, the article layer 15 is oriented in the longitudinal direction X to two sides, namely to the front and to the rear. As a result, a gap arises between the first article 15a and the second article 15b of the article layer 15.

Figure 6:
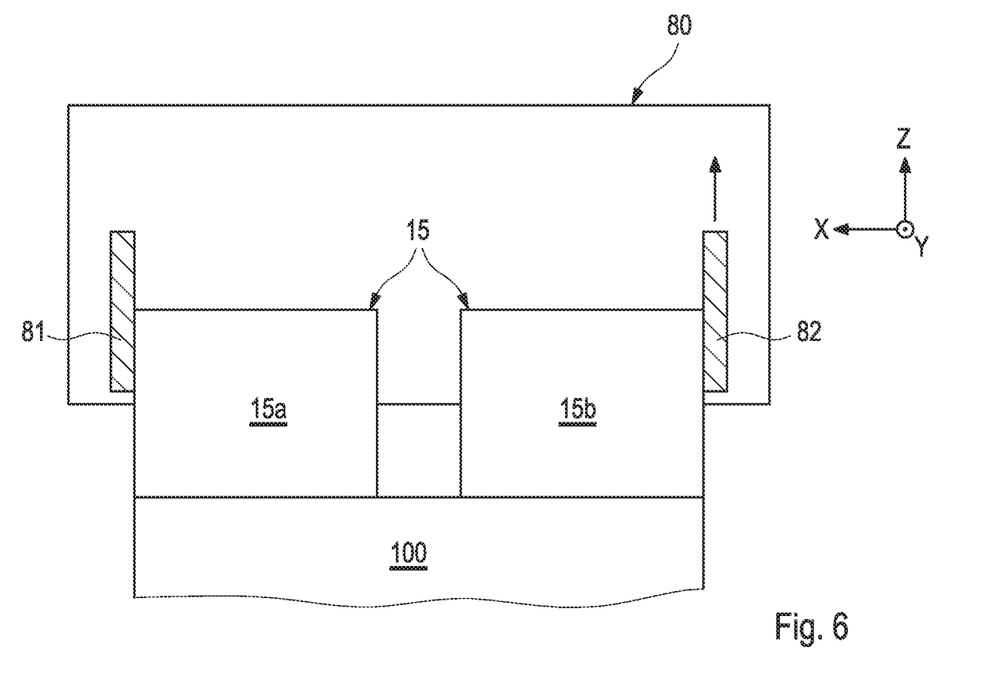
FIG. 6 shows a schematic sectional illustration of the compressing apparatus from FIG. 5 after an article layer has been set down.

FIG. 6 shows a schematic sectional illustration of the compressing apparatus 80 from FIG. 5 after the article layer 15 has been set down on the layer stack 100. In this case, the set-down belt 50 has already been moved in the longitudinal direction X back into the first longitudinal position. The first article 15a of the article layer 15 has been oriented at the front-side stop 81. The second article 15b of the article layer 15 has been oriented at the rear-side stop 82.

The article layer 15 stands on the layer stack 100, wherein a gap has been formed between the first article 15a and the second article 15b in the longitudinal direction X. Subsequently, the compressing apparatus 80 is moved upward, i.e. away from the layer stack 100, in the vertical direction Z.

The invention is not limited to the exemplary embodiments described here and the aspects highlighted therein. Rather, a large number of modifications that lie within the capabilities of a person skilled in the art are possible within the scope defined by the claims.

LIST OF REFERENCE SIGNS

10 Palletizing apparatus
12 Floor
15 Article layer
15a First article
15b Second article
20 Lifting apparatus
31 First carriage
32 Second carriage
50 Set-down belt
52 Conveyor belt
53 Transport face
57 Side wall
61 First deflection roller
62 Second deflection roller
63 Third deflection roller
65 Tensioning roller
67 Drive drum
71 First axis of rotation
72 Second axis of rotation
73 Third axis of rotation
75 Tensioning axis
77 Drive axis
80 Compressing apparatus
81 Front-side stop
82 Rear-side stop
85 Arm
100 Layer stack
105 Pallet
110 Feed apparatus
X Longitudinal direction
Y Transverse direction
Z Vertical direction

The invention claimed is:

1. A palletizing apparatus comprising a set-down belt which has a circulating conveyor belt that defines a transport face for transporting article layers, and a compressing apparatus which has at least one front-side stop and one rear-side stop, wherein the set-down belt is movable in a longitudinal direction (X) relative to the compressing apparatus between a first longitudinal position, in which the transport face is arranged in a manner offset in the longitudinal direction (X) with respect to the compressing apparatus, and a second longitudinal position, in which an article layer located on the transport face is arranged between the at least one front-side stop and one rear-side stop in the longitudinal direction (X), characterized in that the set-down belt comprises a first deflection roller that is rotatable about a first axis of rotation, wherein a diameter of the first deflection roller is at most 2% of the width of the conveyor belt, and in that a control device for controlling the set-down belt is provided, which is set up to drive the circulating conveyor belt with variable speeds such that, when the set-down belt moves from the second longitudinal position into the first longitudinal position, the article layer located on the transport face is pushed temporally in succession against the at least one front-side stop and against the at least one rear-side stop, wherein the control device is set up to circulate the circulating conveyor belt largely synchronously with the movement of the set-down belt in the longitudinal direction (X) such that instances of contact of the article layer with the at least one front-side stop and the rear-side stop are minimized, wherein the set-down belt and the compressing apparatus are movable in a vertical direction (Z) relative to one another, wherein the at least one rear-side stop is movable in the vertical direction (Z) from a standby position into a working position, wherein the conveyor belt bears against the first deflection roller in an angular range of 180°, wherein the transport face has a length between 80% and 120% of the width of the conveyor belt.

2. The palletizing apparatus as claimed in claim 1, wherein the set-down belt comprises a drive drum, which is rotatable about a drive axis, for driving the conveyor belt.

3. The palletizing apparatus as claimed in claim 2, wherein a diameter of the drive drum is greater than the diameter of the first deflection roller.

4. The palletizing apparatus as claimed in claim 2, wherein a drive motor for driving the drive drum with a variable speed is provided.

5. A method for operating a palletizing apparatus, comprising the following steps of:
conveying at least one article layer onto a transport face of a set-down belt while the set-down belt is located in a first longitudinal position,
moving the set-down belt in a longitudinal direction (X) to a second longitudinal position, wherein the set-down belt comprises a circulating conveyor belt, wherein while the set-down belt is being moved in the longitudinal direction (X) from the first longitudinal position to the second longitudinal position, the circulating conveyor belt is not driven,
moving a compressing apparatus and the set-down belt in a vertical direction (Z) relative to one another such that the article layer located on the transport face is located at the height of one or more stops in the vertical direction (Z), wherein a rear-side stop is moved from a standby position, in which the rear-side stop is located above the article layer in the vertical direction (Z), into a working position, in which the rear-side stop is located at the height of the article layer in the vertical direction (Z),
moving the set-down belt in the longitudinal direction (X) relative to the compressing apparatus to the first longitudinal position, wherein the circulating conveyor belt is driven largely synchronously with the movement of the set-down belt in the longitudinal direction (X), such that instances of contact of an article layer with one or more stops are minimized, or wherein the circulating conveyor belt is driven with variable speeds such that the article layer located on the transport face is pushed temporally in succession against a front-side stop and against the rear-side stop.

\* \* \* \* \*